United States Patent
Attarwala et al.

(10) Patent No.: US 7,733,768 B2
(45) Date of Patent: *Jun. 8, 2010

(54) MULTIPLE BUNDLE IDENTIFICATION FOR CALCULATION OF A NETWORK PROTECT PATH RESPONSIVE TO SHARED RESOURCES

(75) Inventors: Murtuza Attarwala, Sunnyvale, CA (US); Premal Desai, San Jose, CA (US)

(73) Assignee: Ciena Corporation, Linthicum, MD (US)

(*) Notice: Subject to any disclaimer, the term of this patent is extended or adjusted under 35 U.S.C. 154(b) by 217 days.

This patent is subject to a terminal disclaimer.

(21) Appl. No.: 11/849,651

(22) Filed: Sep. 4, 2007

(65) Prior Publication Data

US 2007/0297326 A1 Dec. 27, 2007

Related U.S. Application Data

(62) Division of application No. 10/608,572, filed on Jun. 30, 2003, now Pat. No. 7,283,462.

(51) Int. Cl.
*H04J 1/16* (2006.01)
*H04J 3/14* (2006.01)

(52) U.S. Cl. .................. 370/216; 370/227; 370/228

(58) Field of Classification Search .............. None
See application file for complete search history.

(56) References Cited

U.S. PATENT DOCUMENTS

| | | | | |
|---|---|---|---|---|
| 6,108,339 A * | 8/2000 | Norman, Jr. | ............. | 370/405 |
| 6,222,858 B1 * | 4/2001 | Counterman | ............. | 370/474 |
| 7,130,262 B1 * | 10/2006 | Cortez et al. | ............. | 370/216 |
| 2002/0060987 A1 * | 5/2002 | Akkanen et al. | ............. | 370/238 |
| 2002/0141334 A1 * | 10/2002 | Deboer et al. | ............. | 370/227 |
| 2003/0147352 A1 * | 8/2003 | Ishibashi et al. | ............. | 370/248 |
| 2004/0114512 A1 * | 6/2004 | Johri | ............. | 370/225 |
| 2005/0002329 A1 * | 1/2005 | Luft et al. | ............. | 370/222 |
| 2009/0013256 A1 * | 1/2009 | Friedman et al. | ............. | 715/735 |
| 2009/0129772 A1 * | 5/2009 | Trudel et al. | ............. | 398/8 |

* cited by examiner

*Primary Examiner*—Ajit Patel
(74) *Attorney, Agent, or Firm*—Clements Bernard PLLC; Christopher L. Bernard; Tyler S. Brown

(57) ABSTRACT

Protection and working routes are determined responsive to shared resources. The administrative weight value of a route can correspond to the physical distance associated with that route. Once the administrative weight values are assigned, that route having the lowest administrative weight value is designated the working route. The protect route is next identified by reassigning administrative weight values to the remaining routes in the network. Those routes that share resources, such as a fiber bundle or conduit, with the working route are assigned high administrative weight values, while those routes independent of the working route are assigned administrative weight values corresponding to the physical distance of each route. That route having the lowest administrative weight value after working route selection is designated the protect route. Accordingly, by assigning high administrative weight values to routes sharing resources with the working route, those resource-sharing routes are not selected as protect routes. Suitable protect routes, therefore, can be identified quickly and efficiently.

16 Claims, 13 Drawing Sheets

Database  315a

```
Information 400

Cable 120
Administrative weight  -  405a
Port #1 ID   -  410a
Port #2 ID   -  415a
Conduit ID   -  420a Cable 125
Administrative weight  -  405b
Port #1 ID   -  410b
Port #2 ID   -  415b
Conduit ID   -  420b Cable 130
Administrative weight  -  405c
Port #1 ID   -  410c
Port #2 ID   -  415c
Conduit ID   -  420c Cable 135
Administrative weight  -  405d
Port #1 ID   -  410d
Port #2 ID   -  415d
Conduit ID   -  420d Cable 140
Administrative weight  -  405e
Port #1 ID   -  410e
Port #2 ID   -  415e
Conduit ID   -  420e
```

*Figure 4*

Database 315

Cable 1031
Administrative weight - 405f
Port #1 ID       - 410f
Port #2 ID       - 415f
Conduit ID       - 420f
Row ID           - 422f

Cable 1035
Administrative weight - 405g
Port #1 ID       - 410g
Port #2 ID       - 415g
Conduit ID       - 420g
Row ID           - 422g

Cable 1040
Administrative weight - 405h
Port #1 ID       - 410h
Port #2 ID       - 415h
Conduit ID       - 420h
Row ID           - 422h

*Figure 11*

1. Resource Location (32-bit field)

2. Resource Identifier

MULTIPLE BUNDLE IDENTIFICATION FOR CALCULATION OF A NETWORK PROTECT PATH RESPONSIVE TO SHARED RESOURCES

CROSS-REFERENCE TO RELATED APPLICATION(S)

This application is a divisional of U.S. patent application Ser. No. 10/608,572, filed Jun. 30, 2003 now U.S. Pat. No. 7,283,462, and entitled "MULTIPLE BUNDLE IDENTIFICATION FOR CALCULATION OF A NETWORK PROTECT PATH," the contents of which are incorporated in full by reference herein.

FIELD OF THE INVENTION

The present invention relates generally to communication networks, and more particularly to an apparatus and method for selecting a protect path for a working path in a communication network responsive to resources shared between the working and protect paths.

BACKGROUND OF THE INVENTION

Protect routes (paths) are calculated in a communication network in order to serve as backup paths if the working paths in the network become subject to failure. A node (i.e., network element) may support various services such as subnetwork connections (SNCs). If an SNC has a working route and a protect route, then the protect route may be disadvantageously subject to a failure in the following instance. If a link (e.g., an optical fiber or cable) in the working route fails and the protect route shares the same conduit or cable as the failed working route link, then the protect route will also likely fail. There is a continuing need for a method and apparatus that minimize the likelihood of failure for a protect route in a communication network, when the working route fails

BRIEF SUMMARY OF THE INVENTION

Embodiments of the present invention provide an apparatus and method for calculating a protect route in a communication network. A working route is first selected among a plurality of candidate working routes. A protect route is then selected among a plurality of candidate protect routes. Each candidate protect route is classified based upon resources shared with the working route, and the protect route is selected responsive to resources shared with the working length.

In an exemplary embodiment of the present invention, a method for calculating a protect route in a communication network includes selecting a working route among a plurality of candidate working routes in a communication network, and selecting a protect route among a plurality of candidate protect routes in the communication network responsive to resources shared between the protect and working route.

In another exemplary embodiment of the present invention, an apparatus for calculating a protect route in a communication network includes a routing engine configured to select a working route among a plurality of candidate working routes in a communication network, and configured to select a protect route among a plurality of candidate protect routes in the communication network responsive to resources shared between the working route and the protect route; an edge call control module configured to set up the selected working route and protect route in the communication network; and a database configured to store link information for each of the plurality of candidate working routes and the plurality of candidate protect routes that is queried by the routing engine in order to select the protect route.

In yet another exemplary embodiment of the present invention, a method for calculating a protect route in a communication network includes establishing a working route in a communication network based upon a length of the working route, the working route formed by at least one working route link; and establishing a protect route in the communication network, the protect route formed by at least one protect route link, with the protect route being selected based upon a length of the protect route link and based upon whether a link in the protect route shares resources with the working route.

BRIEF DESCRIPTION OF THE DRAWINGS

The present invention is illustrated and described herein with reference to the various drawings, in which like reference numbers denote like method steps and/or system components, respectively, and in which:

FIG. 4 is a block diagram that shows information stored in a database associated with a network node, in accordance with an embodiment of the invention.

FIG. 11 is a block diagram that shows information stored in a database associated with a network node, in accordance with another embodiment of the invention.

DETAILED DESCRIPTION OF THE INVENTION

Consistent with a feature of the present invention, protection and working routes are determined based upon sharing of resources. In one exemplary embodiment, this is done by assigning administrative weight values to each route in a network. The administrative weight value of a route can correspond to the physical distance associated with that route. Once the administrative weight values are assigned, that route having the lowest administrative weight value is designated the working route. The protect route is next identified by reassigning administrative weight values to the remaining routes in the network. Those routes that share resources, such as a fiber bundle or conduit, with the working route are assigned high administrative weight values, while those routes independent of the working route are assigned administrative weight values corresponding to the physical distance of each route. That route having the lowest administrative weight value after working route selection is designated the protect route. Accordingly, by assigning high administrative weight values to routes sharing resources with the working route, those resource-sharing routes are not selected as protect routes. Suitable protect routes, therefore, can be identified quickly and efficiently.

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

Figure 1:
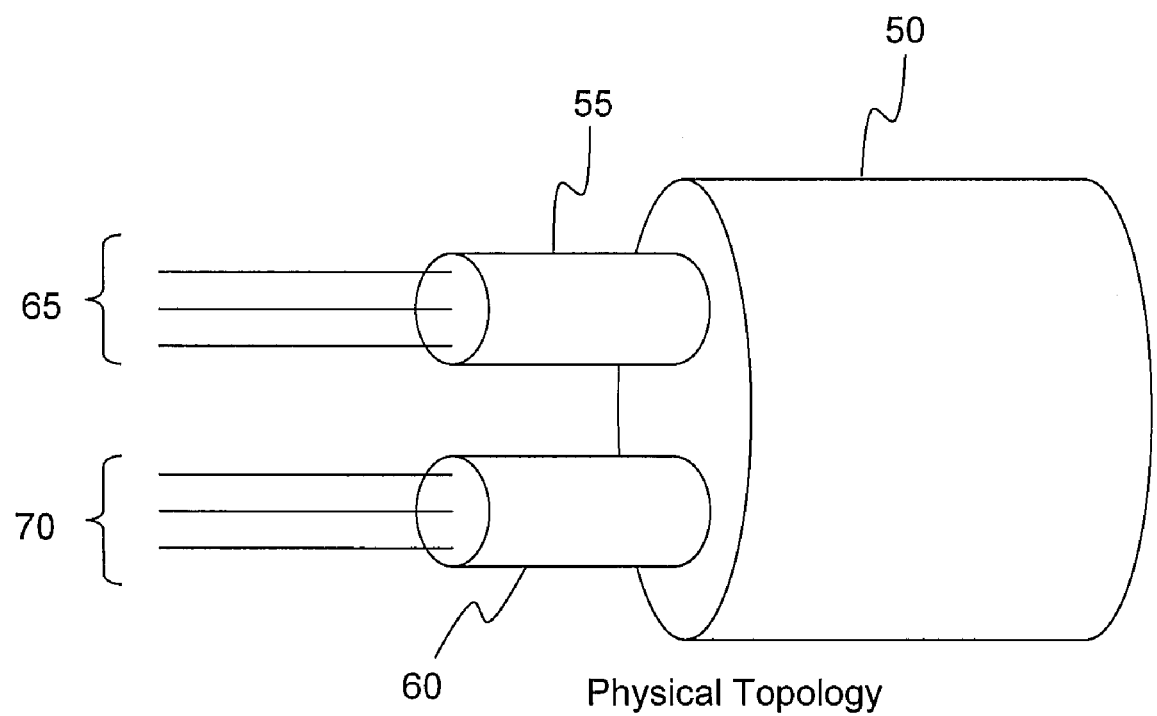
FIG. 1 is a diagram illustrating the physical topology of fibers, fiber cables, and conduits.

FIG. 1 is a diagram illustrating the physical topology of fibers, fiber cables, and conduits. As shown, a conduit (i.e., bundle) 50 may include one or more fiber cables, such as cables 55 and 60. Each cable (e.g., a sheath) may include one or more optical fibers. For example, the cable 55 may include one or more optical fibers 65, while the cable 60 may include one or more optical fibers 70. As described below, one or more conduits 50 can be buried in a "Right Of Way" (ROW) which is defined as land in which the network operator has the right to install conduits. Furthermore, a fiber cable or conduit can be located in a zone and in a region, as described below with reference to FIGS. 12A and 12B. A region may include one or more zones.

Figure 2:
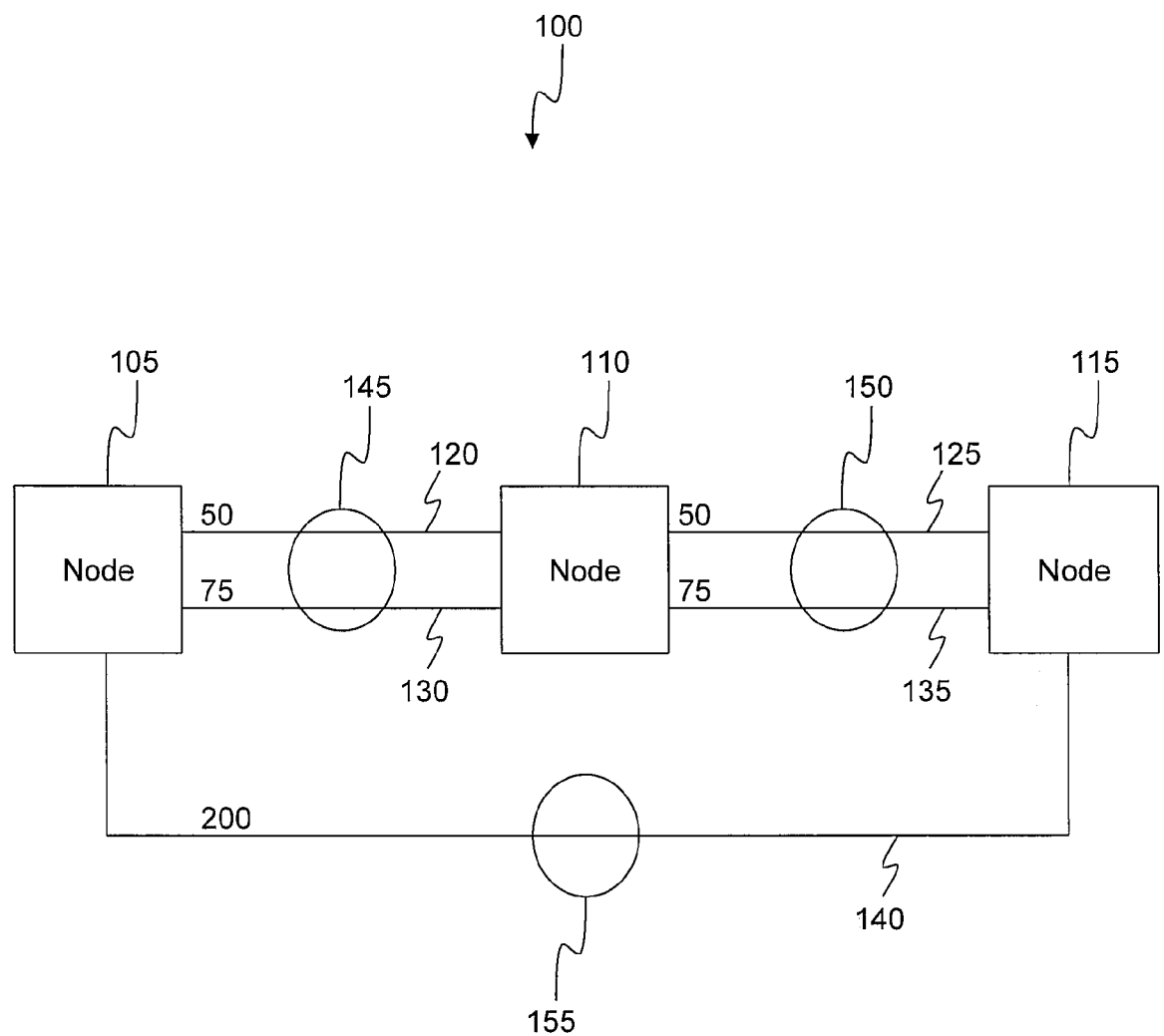
FIG. 2 is a block diagram of a communication network, in accordance with an embodiment of the invention.

FIG. 2 is a block diagram of a communication network 100, in accordance with an embodiment of the invention. The communication network 100 may include, for example, a plurality of nodes such as nodes 105, 110, and 115. The nodes 105 may be, for example, any suitable network element such as the CoreDirector™ switch from CIENA Corporation or any other suitable network element or switching product available from another vendor.

Typically, the nodes 105, 110, and 115 use a protocol, such as an optical signaling and routing protocol (OSRP) or Private Network-Node (Network) Interface protocol (PNNI). Some of the routing and signal functions of OSRP are disclosed in commonly owned and co-pending U.S. patent applications Ser. No. 09/259,263, filed Mar. 1, 1999, entitled "ROUTING AND SIGNALING IN A SONET NETWORK", which is hereby fully incorporated herein by reference, and Ser. No. 09/493,344, filed Jan. 28, 2000, entitled "SYSTEM AND METHOD FOR CALCULATING PROTECTION ROUTES IN A NETWORK PRIOR TO FAILURE", which is hereby fully incorporated herein by reference. The routing protocol in OSRP is responsible for various functions such as discovery of neighbors and link status, reliable distribution of routing topology information, and optimal route determination. The signaling protocol provides various capabilities such as the capability of establishing, tearing down, and modifying connections across a network of nodes (network elements).

Assume that the following links are also present in the communication network 100 for purposes of describing an embodiment of the invention. A fiber cable 120 is connected between node 105 and 110, while a fiber cable 125 is connected between node 110 and node 115. A fiber cable 130 is connected between node 105 and 110, while a fiber cable 135 is connected between node 110 and node 115. A fiber cable 140 is connected between the node 105 and 115. Each of the fiber cables shown in FIG. 2 may include one or more fibers (see, e.g., optical fibers 65 or 70 in FIG. 1).

Assume further in the example of FIG. 2 that the cables 120 and 130 are included in a conduit (i.e., bundle) 145, while the cables 125 and 135 are included in a conduit (i.e., bundle) 150. The cable 140 is included in a conduit (i.e., bundle) 155. Of course, other cables, conduits, and/or network nodes may be included in the communication network 100, and other routing configurations may be implemented in the network 100 within the scope of an embodiment of the invention.

Figure 3:
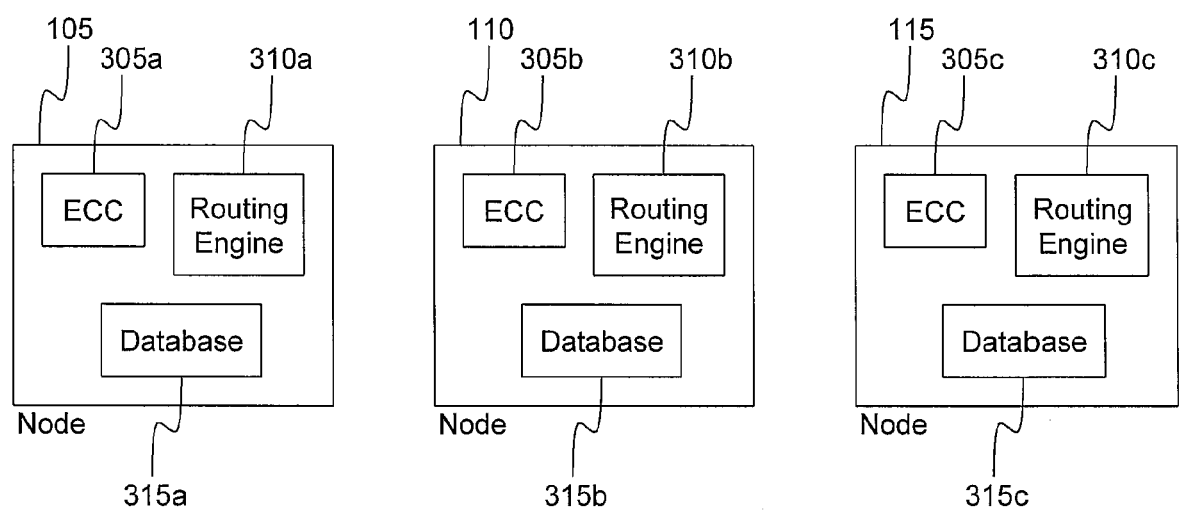
FIG. 3 is a block diagram that shows additional details of a network node, in accordance with an embodiment of the invention.

Referring now to FIG. 3, additional details are shown for each of the network nodes 105, 110, and 115, in accordance with an embodiment of the invention. The network node 105 includes an edge call control (ECC) module 305$a$, a routing engine 310$a$, and a database 315$a$. Similarly, the network node 110 includes an edge call control (ECC) module 305$b$, a routing engine 310$b$, and a database 315$b$, while the network node 115 includes an edge call control (ECC) module 305$c$, a routing engine 310$c$, and a database 315$c$. The operation and functions of an ECC module (generally referred to herein as ECC module 305) and of a routing engine (generally referred to herein as routing engine 310) are described below in additional detail. It is understood that each of the network nodes 105, 110, and 115 includes known elements or modules that may typically be used to perform switching and/or routing functions in the communication network 100.

FIG. 4 is a block diagram that shows information 400 stored in a database 315$a$ which is associated with the network node 105, in accordance with an embodiment of the invention. The information 400 in the database 315$a$ is also stored as identical information in the database 315$b$ and in the database 315$c$.

The information 400 typically includes the following information. The cable 120 (FIG. 2) will have associated information such as an administrative weight 405$a$, port#1 identification (ID) 410$a$, port#2 ID 415$a$, and conduit ID 420$a$. Similarly, other cables in the communications network 100 includes associated information of administrative weight for each cable, port IDs for each cable, and conduit IDs for each cable, as shown in FIG. 4.

In an embodiment of the invention, the administrative weight (generally referred to herein as administrative weight 405) of a cable is determined by the air mile length of the cable from the cable source port to the cable destination port. An air mile is a unit of distance in air travel, equal to one international nautical mile (6,076.115 feet). The administrative weight value 405 is typically assigned by a network operator. The port#1 ID (generally referred to herein as port#1 ID 410) and port#2 ID (generally referred to herein as port#2 ID 415) identify the node ports that are connected to a particular cable. The conduit ID (generally referred to herein as conduit ID 420) identifies the particular conduit that holds the particular cable.

Reference is now made to FIGS. 2, 3 and 4 for purposes of describing a functionality of an embodiment of the invention. Each of the nodes 105, 110, and 115 is set up with the cables 120 through 140 as a soft permanent virtual circuit (SPVC). The Routing Engine 310 in each node can compute a working route for a sub-network connection (SNC) based on the sum of administrative weights 405 of each cable in the working route, and the ECC module 305 in each node can configure the calculated working route. The routing engine 310 can calculate the working route based upon a least cost of administrative weight (i.e., lowest sum of administrative weights 405 of the cables that form the route). The working route is typically selected or set up when the SPVC is first set up in a node (e.g., node 105) in the communication network 100.

In an embodiment, the ECC module 305 in a node manages all SPVCs in a node. Based on the computation performed by the Routing Engine 310, the ECC module 305 in a node will configure the proper working route and protect route for each SPVC. The ECC module 305 will typically request routing engine 310 to compute a protect route in a periodic manner, such as, for example, every approximately 30 seconds. The periodic computation by the routing engine 310 for the protect route ensures that a proper protect route(s) is computed if the network 100 topology changes. For example, if an additional link is added in the communication network 100, the routing engine 310 will compute a proper protect route that takes into consideration any recent changes in the network topology of the communications network 100.

Assume that in FIG. 2, the routing engines 310a, 310b, and/or 310c have calculated a working route formed by cables 120 and 125. The selected working route formed by cables 120 and 125 are selected among candidate working routes in the communication system 100. The selected working route has the least length amount (i.e., least air mile value) among the candidate working routes. The ECC modules 305a, 305b, and 305c can configure the links and appropriate node so that the cables 120 and 125 will form the working route. The routing engines 310a to 310c then calculate the protect route in the communication network 100. Two possible protect routes are considered in the example of FIG. 2. These possible protect routes will be the candidate protect routes. First, the routing engines 310 consider a candidate protect route formed by cable 140. Second, the routing engines 310 consider a candidate protect route formed by the cables 130 and 135.

In an embodiment, the routing engines 310 determine that the cable 140 will be chosen as the selected protect route, since the cable 140 is in the conduit 155 which does not contain any of the working route cables 120 and 125. In other words, the cable 140 is chosen as the selected protect route since the cable 140 does not share any resources (such as a conduit or bundle) with the working route cables 120 and 125.

Figure 12A:
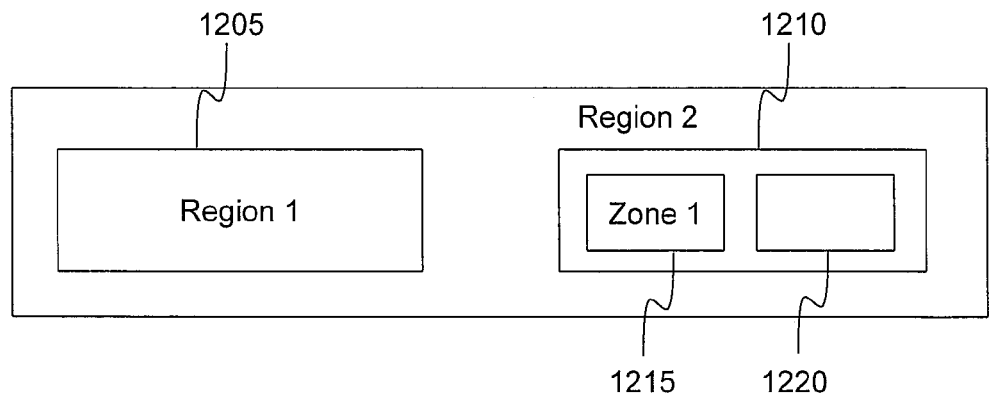
FIG. 12A is a block diagram illustrating another embodiment of the invention.
Figure 12B:
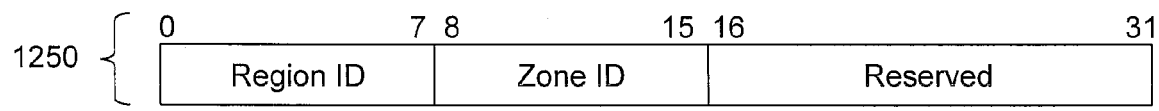
FIG. 12B is a block diagram illustrating identifiers, in accordance with an embodiment of the invention.
Figure 12B:
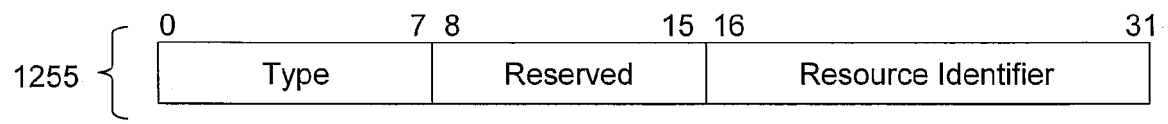

As described below with reference to FIGS. 12A and 12B, other types of shared resources that the routing engines 310 may consider when calculating a protect route include, for example, right of way (ROW), zones, regions. A cable may also be defined as a shared resource that the routing engines 310 may consider if the working route is defined by a fiber and the protect route will also be defined by as another fiber.

The routing engines 310 can determine the conduit assignments of the cables by accessing the information 400 in the database 315 in each node 105, 110, and 115. The conduit IDs 420 will indicate the conduit assignment of a cable. By accessing the database 315, the routing engines 310 can determine that the cable 130 and the working route cable 120 are in the same conduit 145 (i.e., cables 130 and 120 are sharing a resource), and can also determine that the cable 135 and the working route cable 125 are in the same conduit 150 (i.e., cables 135 and 125 are sharing a resource). A physical failure in the conduit 145 and/or conduit 150 (e.g., a cut in the fiber conduit) may cause failure in both the working route (formed by cables 120 and 125) and the cables 130 and 135. Therefore, the routing engines 310 will instead preferably choose the cable 140 (which is a candidate protect route) as the selected protect route and will not select the cables 130 and 135 (which are the other candidate protect routes) as the selected protect route, since a failure in the conduit 145 and/or conduit 150 will not affect the cable 140. If a failure occurs in the working route formed by cables 120 and 125, then the SPVCs in each node will then fail-over to the protect route formed by the cable 140 so that the new working route will be formed by the cable 140.

Thus, the bundle (or conduit) IDs 420 (as stored in the databases 315) are used for calculation of a protect route, and the routing engines 310 will typically select a protect route so that the protect route and the working route are in different conduits (if possible). The protect route is preferably kept in a separate conduit from the working route, because there is a very high probability that the links belonging to the same conduit will go down at the same time. Thus, links or cables having the same conduit (bundle) ID will indicate that these links share a common risk of failure, and the routing engines 310 will attempt to calculate a protect route that does not share the same conduit (and/or other resource) as a working route.

It is further noted that in FIG. 2, it is within the scope of embodiments of the invention that the cables 120, 125, 130, and 135 may instead be optical fibers. Thus, in these embodiments, the conduits 145, 150, and 155 will instead be cables. In these embodiments, each optical fiber 120, 125, 130, and 135 will have an associated cable ID stored in the databases 315, where a cable ID will indicate the particular cable to which a particular fiber is assigned.

A method is now discussed for calculating a protect route in a communication network, in accordance with an embodiment of the invention.

TABLE 1

| Cable | Administrative weight (AW) |
| --- | --- |
| Cable 120 | AW 405a = air miles value = 50 |
| Cable 125 | AW 405b = air miles value = 50 |
| Cable 130 | AW 405c = air miles value + WV1 = 75 + WV1 |
| Cable 135 | AW 405d = air miles value + WV2 = 75 + WV2 |
| Cable 140 | AW 405e = air miles value + WV3 = 200 + WV3 |

In the Table 1 above, in an embodiment, the weighted values WV1, WV2, and WV3 are not different in value if the cables 130, 135, and 140 are in the same conduit (or shared resource) as a cable in the working route, since the value of each of weighted value WV1, WV2, and WV3 will be some predefined high value. As a result, the administrative weight (AW) of each of the cables 130, 135, and 140 in this instance will be increased by the predefined high value. In other words, if cables 130, 135, and 140 are each sharing a resource with the working route, then each of the cables 130, 135, and 140 will have an administrative weight that is increased by a weighted value WV which will be a predefined high value. (The weighted value WV3 of the administrative weight of cable 140 will not be increased in the example of FIG. 2 since the cable 140 is not part of the bundle shared by working path, i.e. cables 120 and 125. In other words, the cable 140 will have an administrative weight (AW) 405e with a weighted value WV3 of zero.)

Assume that the following cables have been assigned the following administrative weights (AW) by a network administrator, as shown in the example of Table 1. The routing engine 310a or 310b (FIG. 3) can query the database 315a or database 315b, respectively, and can determine from the query that the administrative weight value 405a for cable 120 is approximately the air miles value of 50 and that the administrative weight value 405b for cable 125 is approximately the air miles value of 50. The routing engines 310 in the nodes also compare the air miles value of the other cables in the communications network 100. Based on this comparison, the routing engines 310 can determine a route with the least administrative weight value, and this route will form the working route. In the example of FIG. 2, the candidate working route with the least administrative weight value will be a route formed by the cables 120 and 125. In other words, the sum of the administrative weight (AW) values of the candidate working route formed by cables 120 and 125 is less than the total administrative weight value of the other candidate working route formed by cable 140; the sum of the administrative weight (AW) values of the candidate working route formed by cables 120 and 125 is less than the total administrative weight value of the other candidate working route formed by cables 130 and 135. Therefore, cables 120 and 125 are selected to form the links in selected working route, since this selected working route has a least value of administrative weight (i.e., a least length amount or least air mile value) among the candidate working routes. As a result, the ECC modules 305 will configure the cables 120 and 125 as links in the working route.

For the cable 130, the administrative weight may be increased by a weighted value (WV1) that is a pre-defined high value because the cable 130 shares the same resource (i.e., conduit 145) as the working route cable 120. The conduit ID 420c (FIG. 4) permits the Routing Engine 310 to identify the conduit assignment of the cable 130. In the example of FIG. 2, since the cable 130 and the working route cable 120 are in the same conduit 145, the administrative weight of cable 130 will be incremented by a pre-defined high value (e.g., pre-defined value=1×104 or other suitable high values).

Similarly, for the cable 135, the administrative weight 405d may be increased by a weighted value (WV) of the pre-defined high value by the network administrator because the cable 135 shares the same resource (i.e., conduit 150) as the working route cable 125. The conduit ID 420d (FIG. 4) permits the routing engines 310 to identify the conduit assignment of the cable 135. In the example of FIG. 2, since the cable 135 and the working route cable 125 are in the same conduit 150, the administrative weight 405d of cable 135 will be incremented by the pre-defined high value. The above step of increasing the administrative weights is performed only in the protect route computation. During the working route computation, the routing engine 310 knows the conduit IDs, but does not use the conduit IDs to calculate the working route.

For the cable 140, the administrative weight 405e is not increased because the cable 140 does not share the same resources (i.e., conduits) as the working route cables 120 and 125. The conduit ID 420e (FIG. 4) permits the routing engines 310 to identify the conduit assignment of the cable 140. In the example of FIG. 2, since the cable 140 is in conduit 155 and is not in the same conduit(s) as the working route cable 120 and working route cable 135, the weighted value (WV3) will be zero, and as a result, the administrative weight value (AW) 405e (FIG. 4) of cable 140 will not be incremented by a weighted value of a pre-defined high value. In other words, since the cable 140 is separated from the resource (as defined by conduit 145) that contains the cable 120 in the working route and is also separated from the resource (as defined by conduit 150) that contains the cable 125 in the working route, the administrative weight (AW) 405e of cable 140 will include a weighted value (WV3) with a value of zero.

Since the administrative weight value (AW) 405e of cable 140 is not incremented by the pre-defined high value, while the administrative weight value 405c for cable 130 and administrative weight value 405d for cable 135 are incremented by the pre-defined high value (i.e., administrative weight value 405c>administrative weight value 405e, and administrative weight value 405d>administrative weigh value 405e), the routing engine 310 will choose cable 140 as the protect route. In other words, the selected protect route (formed by the link that is formed by cable 140) has a least value of administrative weight (AW) among the candidate protect routes.

Figure 5:
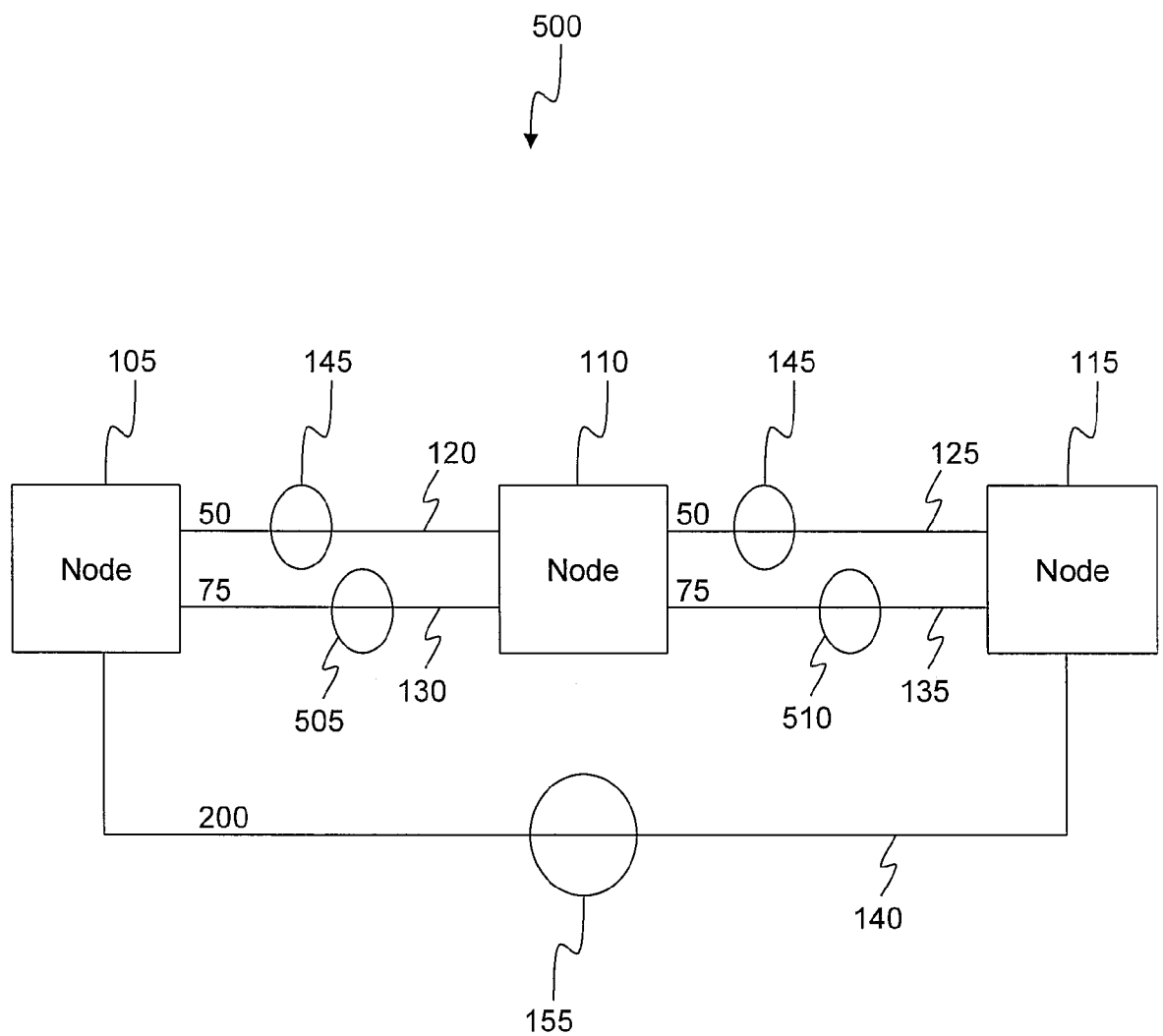
FIG. 5 is a block diagram of a communication network, in accordance with an embodiment of the invention.

FIG. 5 illustrates a communication network 500, for purposes of showing another example method for determining a protect route, in accordance with an embodiment of the invention. Assume that the cable 130 is in a conduit 505 and is not in the same conduit 145 which holds the working route cable 120. Assume further that the cable 135 is in a conduit 510 and is not in the same conduit 150 which holds the working route cable 125. Thus, based on the equations shown in Table 1 above, for the cable 130, the administrative weight (AW) 405c is equal to a value based on the cable's air miles length (e.g., value 75 in Table 1) plus a weighted value (WV1) which is determined by the conduit assignment of the cable 130. In the example of FIG. 5, since the cable 130 and the working route cable 120 are in different conduits, the weighted value (WV1) for cable 130 will be zero, and as a result, the administrative weight value 405c of cable 130 will be equal to or substantially depend upon the air mile value of cable 130 (air mile value of 75 in this example).

Based on the equations shown in Table 1, for the cable 135, the administrative weight (AW) 405c is equal to a value based on the cable's air miles length (e.g., value 75 in Table 1) plus a weighted value (WV2) which is determined by the conduit assignment of the cable 135. In the example of FIG. 5, since the cable 135 and the working route cable 125 are in different conduits, the weighted value (WV2) for cable 135 will be zero, and as a result, the administrative weight value 405d of cable 135 will be equal to or substantially depend upon the air mile value of cable 135 (air mile value of 75 in this example).

For cable 140, the administrative weight is equal to a value based on the cable's air miles length (e.g., value 200 in Table 1) plus a weighted value (WV3) which is determined by the conduit assignment of the cable 140. In the example of FIG. 5, since the cable 140 is in conduit 155 and is not in the same conduit(s) as the working route cable 120 and working route cable 125, the weighted value.

(WV3) of cable 140 will be zero, and as a result, the administrative weight value (AW) 405e of cable 140 will be equal to or substantially depend upon the air mile value of cable 140 (air mile value of 200 in this example).

Since the administrative weight value 405e of cable 140 is 200, while the sum of the administrative weight value 405c for cable 130 and the administrative weight value 405d for cable 135 is 150(150=75+75), the routing engine 310 will choose the candidate protect route formed by cables 130 and 135 as the selected protect route, since the cables 130 and 135 provide the least administrative weight value for a protect route in this example. In particular, the administrative weight value sum of 150 of cables 130 and 135 is less than the administrative weight value of 200 for cable 140. In other words, the selected protect route (formed by cables 130 and 135) has a least value of administrative weight (AW) among the candidate protect routes.

Figure 6:
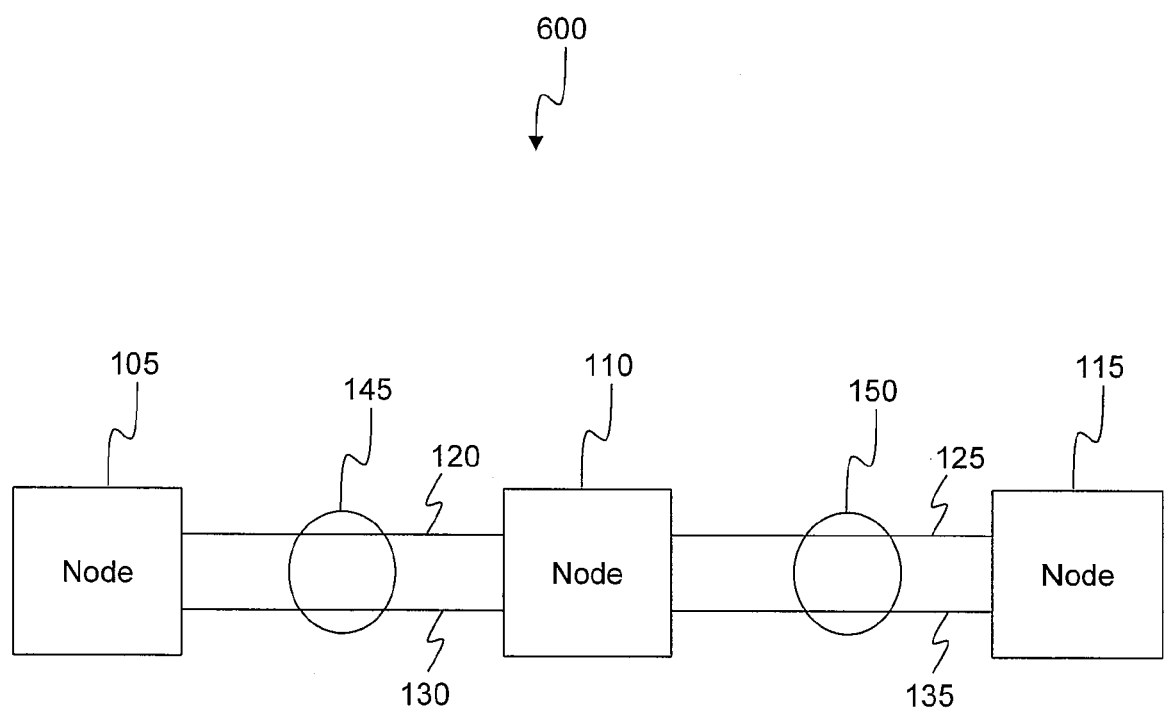
FIG. 6 is a block diagram of a communication network, in accordance with an embodiment of the invention.

FIG. 6 illustrates a communication network 600, for purposes of showing another example method for determining a protect route, in accordance with an embodiment of the invention. In the communication network 600, assume the cable 140 (as shown in FIG. 2) does not exist as a link between the nodes 105 and 115. As a result the routing engine 310 will calculate the protect route as the candidate protect route formed by cables 130 and 135, even if the cable 130 and working route cable 120 are in the same conduit 145 and the cable 135 and the working route cable 25 are in the same conduit 150. In this example, the high value administrative weight sum of cables 130 and 135 is also the least administrative weight value. In other words, the selected protect route (formed by cables 130 and 135) also has a least value of administrative weight (AW) among the candidate protect routes.

Figure 7:
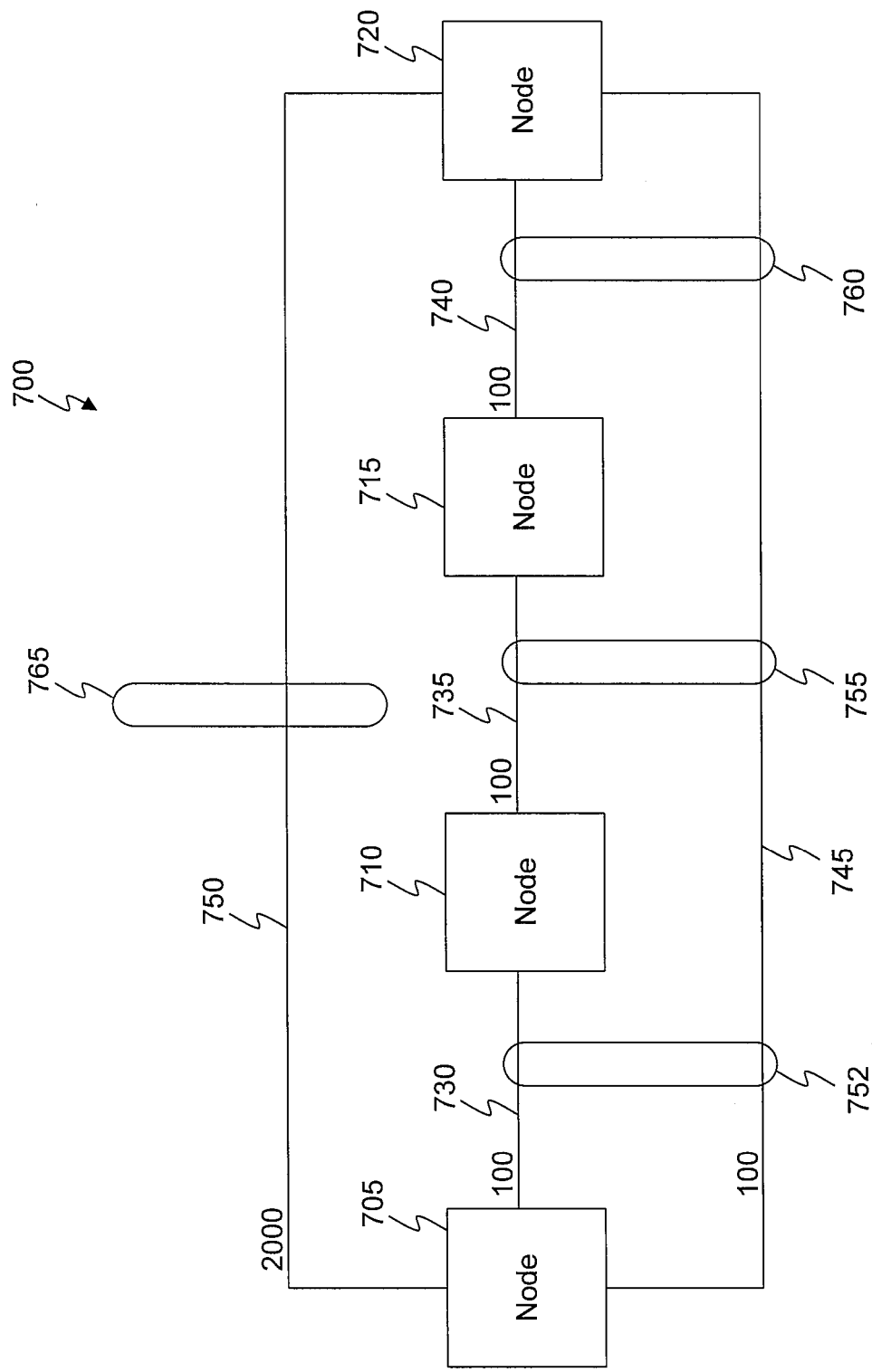
FIG. 7 is a block diagram of a communication network, in accordance with an embodiment of the invention.

FIG. 7 illustrates a communication network 700, for purposes of showing another example method for determining a protect route, in accordance with an embodiment of the invention. The communication network 700 may include, for example, a plurality of nodes such as nodes 705, 710, 715 and 720.

Assume that the following links are also present in the communication network 700 for purposes of describing an embodiment of the invention. A fiber cable 730 is connected between node 705 and 710, while a fiber cable 735 is connected between node 710 and node 715. A fiber cable 740 is connected between node 715 and 720. A fiber cable 745 is connected between node 705 and 720, while a fiber cable 750 is connected between node 705 and node 720.

Assume further in the example of FIG. 7 that the cables 730 and 745 are included in a conduit 752, while the cables 735 and 745 are included in a conduit 755 and the cables 740 and 745 are included in a conduit 760. Thus, in this example, the cable 745 is routed through a plurality of bundles (i.e., conduits 752, 755, and 760). The cable 750 is included in a bundle 765. Of course, other cables, conduits, and/or network nodes may be included in the communication network 700, and other routing configurations may be implemented in the network 700 within the scope of an embodiment of the invention.

TABLE 2

| Cable | Administrative weight (AW) |
|---|---|
| Cable 745 | AW = air miles value = 100 |
| Cable 730 | AW = air miles value + WV4 = 100 + WV4 |
| Cable 735 | AW = air miles value + WV5 = 100 + WV5 |
| Cable 740 | AW = air miles value + WV6 = 100 + WV6 |
| Cable 750 | AW = air miles value + WV7 = 2000 + WV7 |

Assume that the following cables have been assigned the following administrative weights (AW), as shown in the example of Table 2. Any of the routing engines 310 can query a database 315 (associated with a node in FIG. 7) and can determine from the query that the administrative weight value (AW) for cable 745 is approximately the air miles value of 100. The routing engines 310 in the nodes can also compare the air miles value of the other cables in the communications network 700. Based on this comparison, the routing engine 310 can determine a candidate working route with the least administrative weight value, and this route will form the working route. In the example of FIG. 7, the candidate working route with the least administrative weight value (i.e., least air mile value) will be a route formed by the cable 745. As a result, the ECC modules 305 will configure the cable 745 as a link in the selected working route.

For the cable 730, the administrative weight (AW) will be given a value, based on the conduit assignment of the cable 730. In the example of FIG. 7, since the cable 730 and the working route cable 745 are in the same conduit 752, the administrative weight (AW) of cable 730 will include a weighted value (WV4) of a predefined high value.

Similarly, for the cable 735, the administrative weight (AW) will be given a value based on the conduit assignment of the cable 735. In the example of FIG. 7, since the cable 735 and the working route cable 745 are in the same conduit 755, the administrative weight (AW) of cable 735 will include a weighted value (WV5) of a predefined high value. Similarly, for the cable 740, the administrative weight (AW) will be given a value based upon the conduit assignment of the cable 740. In the example of FIG. 7, since the cable 740 and the working route cable 745 are in the same conduit 760, the administrative weight (AW) of cable 740 will include a weighted value (WV6) of a predefined high value.

For the cable 750, the administrative weight (AW) will be given a value based upon the conduit assignment of the cable 750. In the example of FIG. 7, since the cable 750 is in conduit 765 and is not in the same conduit(s) as the working route cable 745, the administrative weight (AW) of cable 750 will include a weighted value (WV7) of zero, and as a result, the administrative weight value (AW) of cable 750 will be approximately equal to or substantially depend upon the air mile value of the cable 750 (air mile value of approximately 2000 in this example).

Since the administrative weight value of cable 750 is at approximately 2000, while the administrative weight values for cables 730, 735, and 740 are maximized (i.e., sum of administrative weight values for cables 730, 735, and 740>administrative weight value for cable 750), the routing engines 310 will choose cable 750 as the protect route. In other words, the selected protect route (formed by cable 750) has a least value of administrative weight (AW) among the candidate protect routes.

Figure 8:
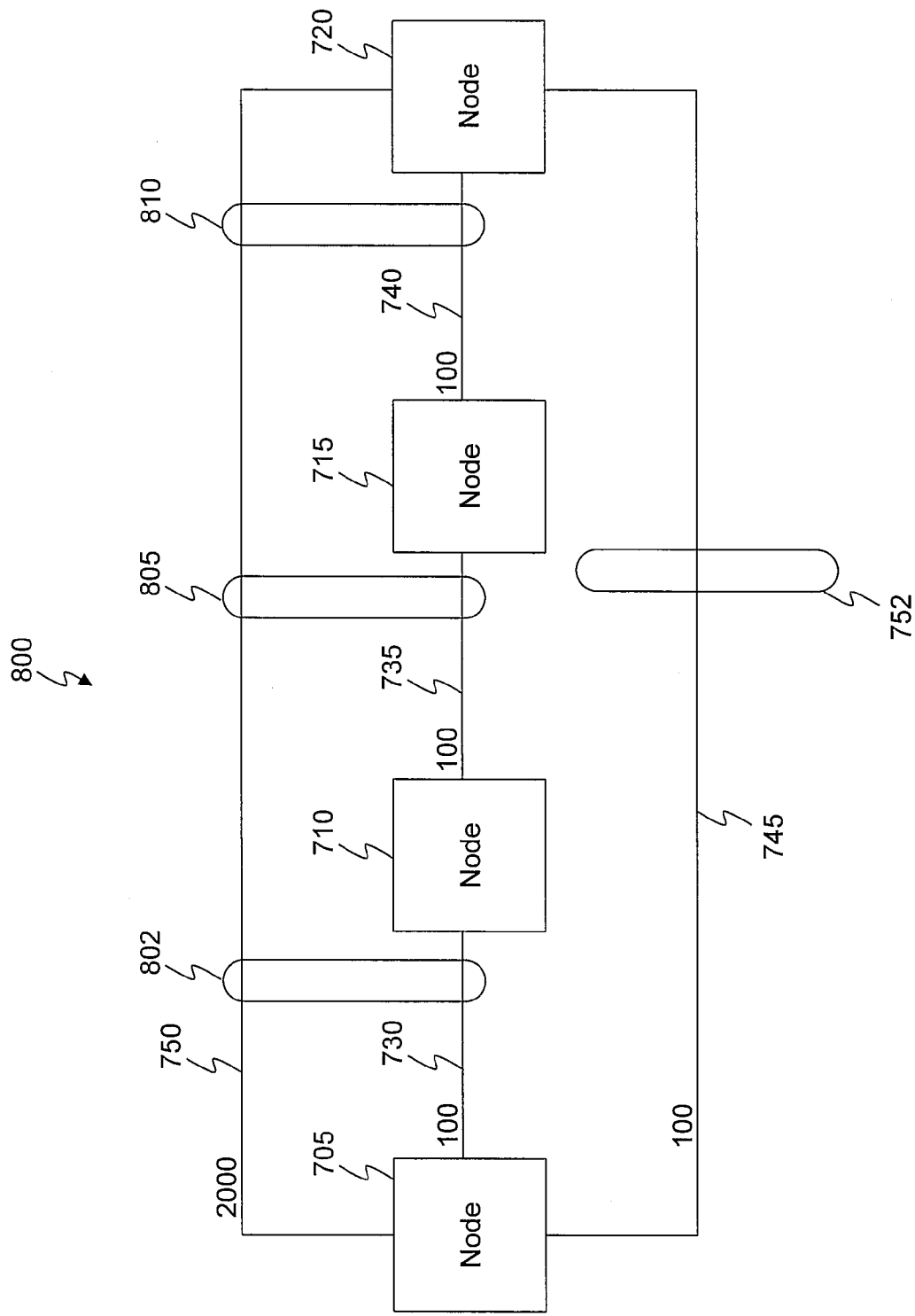
FIG. 8 is a block diagram of a communication network, in accordance with an embodiment of the invention.

FIG. 8 illustrates a communication network 800, for purposes of showing another example method for determining a protect route, in accordance with an embodiment of the invention. Assume that the cable 745 is included in the conduit 752. Assume further that the cables 750 and 730 are included in a conduit 802, while the cables 735 and 750 are included in a conduit 805 and the cables 740 and 750 are included in a conduit 810. Of course, other cables, conduits, and/or network nodes may be included in the communication network 800, and other routing configurations may be implemented in the network 100 within the scope of an embodiment of the invention.

Assume that the following cables have been assigned the following administrative weights (AW), as shown in the example of Table 2. As in the example of FIG. 7, the candidate working route with the least administrative weight value will be a route formed by the cable 745. As a result, the ECC modules 305 will configure the cable 745 as a link in the working route.

For the cable 730, the administrative weight (AW) is equal to a value based on the cable's air miles length (e.g., value 100 in Table 2) plus a weighted value (WV4) which is determined by the conduit assignment of the cable 730. In the example of FIG. 8, since the cable 730 is in conduit 802 and is not in the same conduit(s) as the working route cable 745, the administrative weight (AW) of cable 730 will include a weighted value (WV4) of zero, and as a result, the administrative weight value (AW) of cable 730 will be approximately equal to or substantially depend upon the air mile value of the cable 730 (air mile value of approximately 100 in this example).

For the cable 735, the administrative weight (AW) is equal to a value based on the cable's air miles length (e.g., value 100 in Table 2) plus a weighted value (WV5) which is determined by the conduit assignment of the cable 735. In the example of FIG. 8, since the cable 735 is in conduit 805 and is not in the same conduit(s) as the working route cable 745, the administrative weight (AW) of cable 735 will include a weighted value (WV5) of zero, and as a result, the administrative weight value (AW) of cable 735 will be approximately equal to or substantially depend upon the air mile value of the cable 735 (air mile value of approximately 100 in this example).

Similarly, for the cable 740, the administrative weight (AW) is equal to a value based on the cable's air miles length (e.g., value 100 in Table 2) plus a weighted value (WV6) which is determined by the conduit assignment of the cable 740. In the example of FIG. 8, since the cable 740 is in conduit 810 and is not in the same conduit(s) as the working route cable 745, the administrative weight (AW) of cable 740 will include a weighted value (WV6) of zero, and as a result, the administrative weight value (AW) of cable 740 will be approximately equal to or substantially depend upon the air mile value of the cable 740 (air mile value of approximately 100 in this example).

For the cable 750, the administrative weight (AW) is equal to a value based on the cable's air miles length (e.g., value 2000 in Table 2) plus a weighted value (WV7) which is determined by the conduit assignment of the cable 750. In the example of FIG. 8, since the cable 750 is in the conduits 802, 805, and 810 and is not in the same conduit(s) as the working route cable 745, the administrative weight (AW) of cable 750 will include a weighted value (WV7) of zero, and as a result, the administrative weight value (AW) of cable 750 will be approximately equal to or substantially depend upon the air mile value of the cable 750 (air mile value of approximately 2000 in this example).

Since the administrative weight value (AW) of cable 750 is at approximately 2000, while the sum of the administrative weight values for cables 730, 735, and 740 is about 300 (300=100+100+100), the routing engines 310 will choose the protect route formed by cables 730, 735, and 740, since the cables 730, 735, and 740 provide the least administrative weight value for a protect route in this example. In particular, the administrative weight value sum of 300 of cables 730, 735, and 740 is less than the administrative weight value of 2000 for cable 750. In other words, the selected protect route (formed by cables 730, 735, and 740) has a least value of administrative weight (AW) among the candidate protect routes.

Figure 9A:
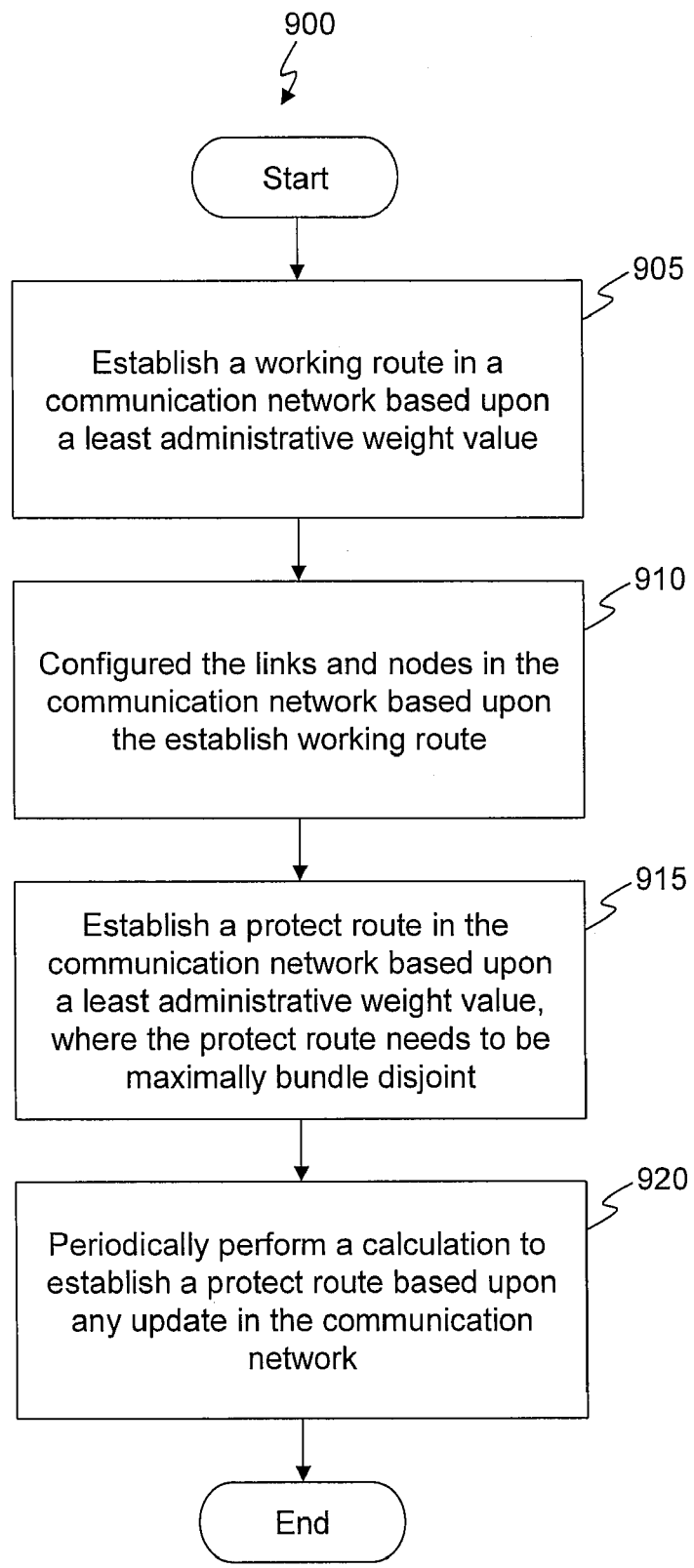
FIG. 9A is a flow diagram of a method for calculating a protect route in a communication network, in accordance with an embodiment of the invention.

FIG. 9A is a flow diagram of a method 900 for calculating a protect route in a communication network, in accordance with an embodiment of the invention. As noted above, each of a plurality of administrative weight values are assigned to a respective one of a plurality of routes in a network. A first administrative weight value is identified which is less than remaining administrative weight values and has the least length-dependant administrative weight value. A working route corresponding to the least administrative weight value is designated and established (905) in the communication network. The links and nodes in the communication network are then configured (910) based upon the established working route. A protect route is then established (915) in the communication network based on a least value of administrative weight (AW), where each candidate protect route is assigned an administrative weight (AW), where the protect route needs to be maximally bundle disjoint (i.e., the protect route is disjoint or separated from the working route when possible). Namely, a second administrative weight value is identified from remaining administrative weight values which is less than the other remaining administrative weight values. The route corresponding to this second administrative weight value is designated the protect route. The protect route often does not share a resource, such as a fiber bundle, with the working route.

It is noted that in an embodiment, the protect route typically does not have any identifiers, and that the cables in the working route and protect routes have the identifier. If a cable shares a resource of the working route and protect route, then the protect route computation will increase the administrative weight of the cable by a weighted value (WV) of a predefined high value. Accordingly, a subset of the routes sharing a resource with the working route have administrative weight values greater than other routes that do not share the resource with the working route and are not in the subset.

In an embodiment, the protect route is determined based upon the conduit (bundle) identification of each cable in a candidate protect route. A calculation is periodically performed (920) to determine a protect route based upon a topology change or any topology in the communication network.

Figure 9B:
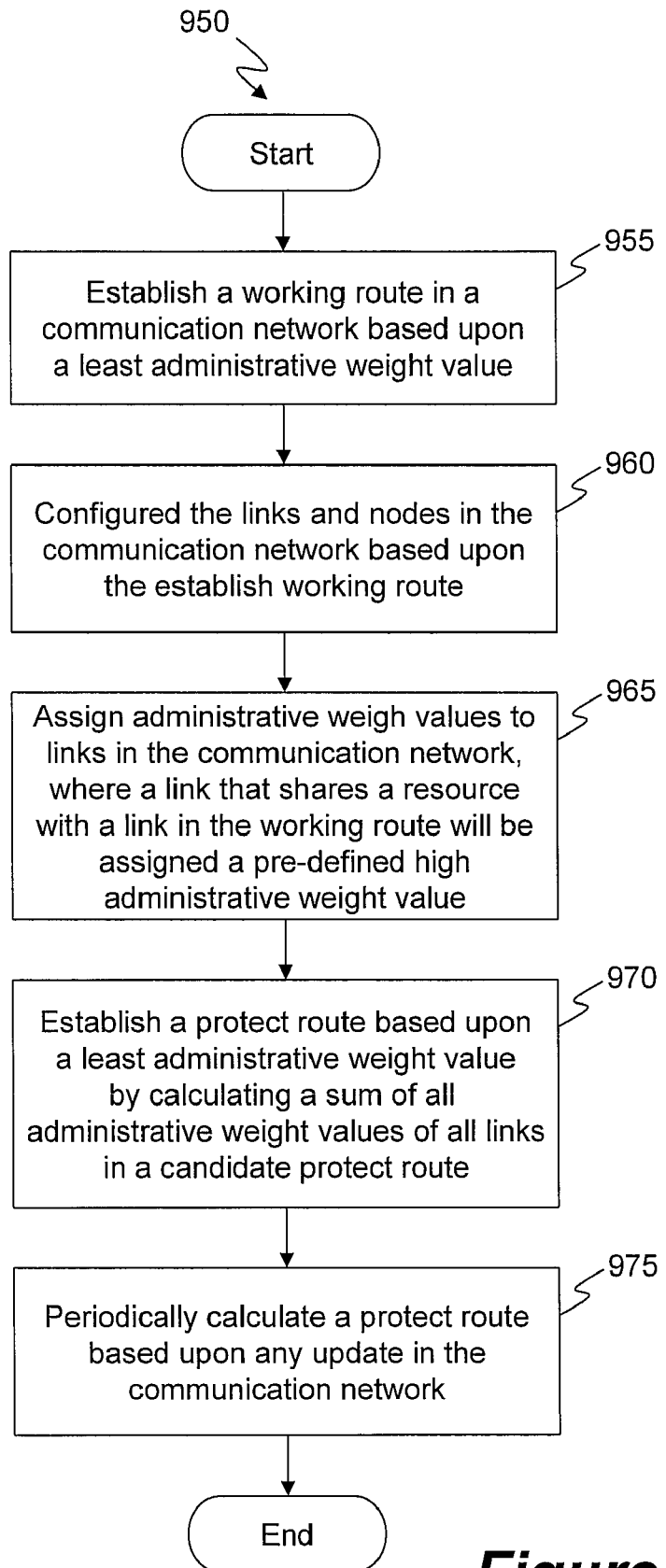
FIG. 9B is a flow diagram illustrating additional details of a method for calculating a protect route in a communication network, in accordance with an embodiment of the invention.

FIG. 9B is a flow diagram illustrating additional details of a method 950 for calculating a protect route in a communication network, in accordance with an embodiment of the invention. A working route is first established (955) in a communication network based upon a least administrative weight value that is dependent upon a length of the working route. The links and nodes in the communication network are then configured (960) based upon the established working route. Administrative weight values are assigned (965) to links in the communication network, where a link that shares a resource (e.g., conduit) with a link in the working route will be assigned an administrative weight (AW) with a weighted value (WV) of a pre-defined high value. In the communication network, a protect route is then established (970) based upon a least value of administrative weight, by calculating a sum of all administrative weight values (AV) of all links in each candidate protect route. A calculation is then periodically performed (975) to establish a protect route (or to change the protect route) based upon a topology change or any topology change in the communication network.

Figure 10:
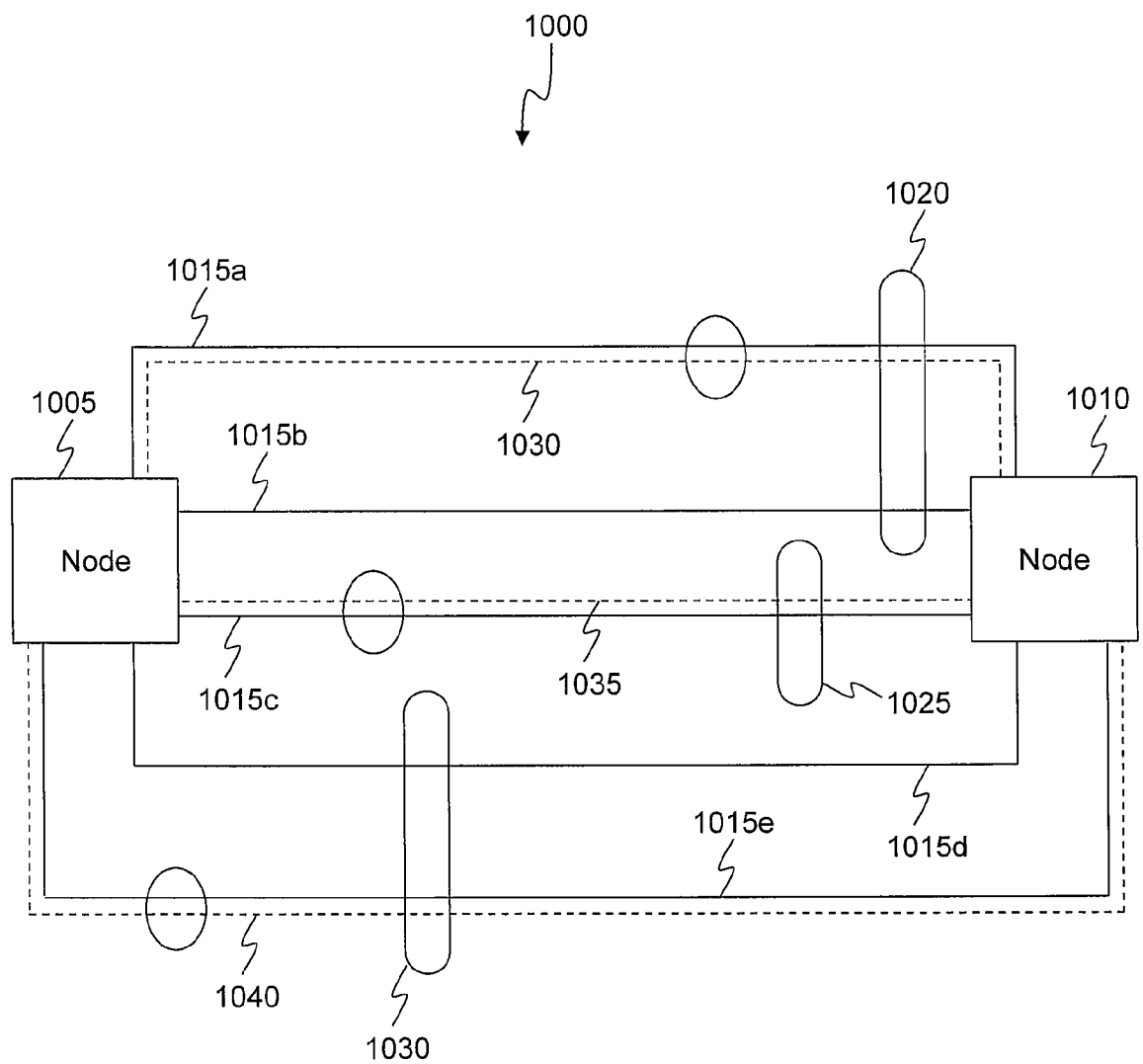
FIG. 10 is a block diagram of a communication network, in accordance with an embodiment of the invention.

FIG. 10 is a block diagram of a communication network 1000, where one or more conduits are buried in a ROW (Right Of Way). The term ROW is land in which the network operator has the right to install conduits. For example, assume that the network 1000 includes the nodes 1005 and 1010. Assume further that a plurality of conduits 1015a-1015e connect the nodes 1005 and 1005. As shown in FIG. 10, the conduits 1015a and 1015b are in ROW 1020, while the conduit 1015c is in ROW 1025.

The conduits 1015d and 1015e are in ROW 1030. Assume that a working route (formed by cable 1031) is included in the conduit 1015c and is in ROW 1020. This working route cable 1031 is identified in the database 315 by an associated conduit ID 420f and ROW ID 422f.

A cable 1035 in the conduit 1015c and ROW 1025 similarly identified by an associated conduit ID 420g and ROW ID 422g in the database 315. Similarly, a cable 1040 in the conduit 1015e and ROW 1030 similarly identified by an associated conduit ID 420h and ROW ID 422h in the database 315. Other cables (and/or optical fibers) in the network 1000 are identified by their associated conduit IDs, ROW IDs, and/or cable IDs (for optical fibers). As in the above examples, each cable will also have an associated administrative weight 405 and port IDs 410 and 415.

The cable 1035 can be selected by the routing engines 310 as the protect path since the cable 1035 and working route cable 1031 are in different ROWs. If the cable 1035 and working route cable 1031 are in different ROWs, then the administrative weight value (AW) of the cable 1035 may, for example, not be increased by the network administrator by a weighted value (WV) of a pre-defined high value. Conversely, if cable 1035 and working route cable 1031 are in the same ROW, then the administrative weight value (AVJ) of the cable 1035 may, for example, be increased by the network administrator by a weighted value (WV) of a pre-defined high value. Similarly, the cable 1040 can be selected by the routing engines 310 as the protect path since the cable 1040 and working route cable 1031 are in different ROWs. As an example, the routing engines 310 will select the cable 1035 as the protect route if the cable 1035 has a lesser administrative weight value than the administrative weight value of the cable 1040 and since the cable 1035 and working route cable 1031 are in different ROWs. In this example, the cable 1035 may not only be in a different ROW from the working route cable 1031, but also the cable 1035 may have a lesser air mile value (or lesser length amount) than the cable 1040.

Thus, if a link shares the same ROW as a working route link, then the network administrator can increase the administrative weight value of that link by a weighted value (WV) of a predefined high value. The routing engines 310 will calculate a protect path based upon a least administrative weight value, as previously described above.

This physical configuration naturally leads to a hierarchical structure. To support this hierarchical structure, a fiber ID, cable ID, conduit ID 420 and ROW ID 422 can form a risk ID for purposes of determining a protect route.

Another level of shared risk is the geographic topology, i.e., the location of the physical resources (e.g., fiber cable, conduit, nodes). As shown the embodiment of FIG. 12A, a geographic topology may include one or more zones 1215 and 1220, where a zone includes one or more nodes whose location is limited to a confined area for the sake of maintainability. Zones have a fixed number of exit points and are non-overlapping. A zone may define a particular geographic characteristic such as, for example, an earthquake zone.

A region includes one or more zones whose location covers the individual locations of each of the area composing this region. For example, a region 1210 includes the zones 1215 and 1220, while the zones 1215 and 1220 are external to the region 1205. Thus, a region and zone represent the hierarchy at the geographic level.

For this purpose of associating nodes in zones or regions, a conduit (bundle) ID 420 will include a resource location ID 1250 and a resource identifier 1255. So now, instead of being a flat structure, a bundle ID 420 will include a resource identifier 1250 and a resource location identifier 1255. A resource location ID 1250 can identify a particular region and/or zone. A resource identifier 1250 for bundle ID 420 will be, for example, a 4-byte integer with the value still being represented by the 2 least significant bit (LSB) and the most significant bit (MSB) will be used to represent the type with which this identifier is associated. This type can be a fiber, fiber cable, conduit, or ROW. Thus, the identifiers 1250 and 1255 can be used to insure that a fiber, fiber cable, conduit, or ROW for a protect route is in a separate zone and/or region from the working route. For example, for the network 1000 in FIG. 10, if the working route 1030 is in the zone 1215, then the protect route 1035 may be selected if the protect route is in zone 1220. As another example, if the working route 1030 is in the region 1205, then the protect route 1035 may be selected if the protect route is in the region 1210.

Thus, if a link shares the same zone (or region) as a working route link, then the network administrator can increase the administrative weight value (AW) of that link by a weighted value (WV) of a predefined high value. The routing engine 310 will calculate a protect path based upon a least value of administrative weight, as previously described above.

A zone is not limited to an earthquake zone, and a region is not limited to an earthquake region. Other types of zones and regions may be considered in embodiments of the invention. Therefore, in other embodiments of the invention, a zone or region may be defined to include other types of geographic characteristics, such as, for example: (1) an undersea zone or/and undersea regions; (2) a temporary high risk region or/and temporary high risk zone (e.g., where a temporary high risk area may be a construction area in a street or city block); and/or (3) other types of zones or regions.

In an embodiment of the invention, the condition of a fiber or cable may be used as an additional factor to determine risk. In other words, a network administrator can increase an administrative weight for a link by a weighted value (WV) of a predefined high value, if at least one of the following conditions is present: (1) a hanging cable; (2) a cable passing under a train track or other particular areas or high risk areas, (3) an underground cable; (4) a cable having of old aging fibers versus a cable having newer fibers; and/or (5) a particular fiber type or cable type (i.e., some fiber types or cable types may have more risks than other fiber types or cable types).

Reference throughout this specification to "one embodiment", "an embodiment", or "a specific embodiment" means that a particular feature, structure, or characteristic described in connection with the embodiment is included in at least one embodiment of the present invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

Other variations and modifications of the above-described embodiments and methods are possible in light of the foregoing teaching. Further, at least some of the components of this invention may be implemented by using a programmed general purpose digital computer, by using application specific integrated circuits, programmable logic devices, or field programmable gate arrays, or by using a network of interconnected components and circuits. Connections may be wired, wireless, by modem, and the like.

The various engines or modules discussed herein may be, for example, software, commands, data files, programs, code, modules, instructions, hardware, circuits, combinations thereof, or any of the like, and may also include suitable mechanisms. It will also be appreciated that one or more of the elements depicted in the drawings/figures can also be implemented in a more separated or integrated manner, or even removed or rendered as inoperable in certain cases, as is useful in accordance with a particular application. It is also within the scope of the present invention to implement a program or code that can be stored in a machine-readable medium to permit a computer to perform any of the methods described above.

Additionally, the signal arrows in the drawings/Figures are considered as exemplary and are not limiting, unless otherwise specifically noted. Furthermore, the term "or" as used in this disclosure is generally intended to mean "and/or" unless otherwise indicated. Combinations of components or steps will also be considered as being noted, where terminology is foreseen as rendering the ability to separate or combine is unclear.

The description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for calculating a protect route in a communication network, the method comprising:
    selecting a working route among a plurality of candidate working routes in a communication network; and
    selecting a protect route among a plurality of candidate protect routes in the communication network responsive to resources shared between the protect and working route;
    wherein each of the candidate protect routes in the plurality of candidate protect routes are classified based upon whether a link shares a resource with the working route; and
    wherein the selecting a protect route step attempts to select the protect route first from the candidate protect routes which do not share resources with the working route.

2. The method of claim 1, wherein the working route has a least length amount among the plurality of candidate working routes.

3. The method of claim 1, further comprising: periodically calculating a protect route based upon a topology change in the communication network.

4. The method of claim 1, wherein a link of a candidate protect route can be determined to share a resource with a link of the working route by use of an identifier of the link of the candidate protect route.

5. The method of claim 4, wherein the identifier comprises at least one of a fiber identifier, cable identifier, conduit identifier, right of way (ROW) identifier, zone identifier, and region identifier.

6. The method of claim 1, wherein each of the working route and protect route comprises at least one of a fiber and cable.

7. The method of claim 1, wherein the resource comprises at least one of a cable, conduit, right of way (ROW), zone, and region.

8. An apparatus for calculating a protect route in a communication network, the apparatus comprising:
    a routing engine configured to select a working route among a plurality of candidate working routes in a communication network, and configured to select a protect route among a plurality of candidate protect routes in the communication network responsive to resources shared between the working route and the protect route;
    an edge call control module configured to set up the selected working route and protect route in the communication network; and
    a database configured to store link information for each of the plurality of candidate working routes and the plurality of candidate protect routes that is queried by the routing engine in order to select the protect route;
    wherein the link information classifies each of the candidate protect routes in the plurality of candidate protect routes based upon whether a link shares a resource with the working route; and
    wherein the edge call control module attempts to select the protect route first from the candidate protect routes which do not share resources with the working route.

9. The apparatus of claim 8, wherein the working route has a least length amount among the plurality of candidate working routes.

10. The apparatus of claim 8, wherein the edge call control module is configured to periodically request the routing engine to calculate a protect route based upon a topology change in the communication network.

11. The apparatus of claim 8, wherein a link of a candidate protect route can be determined to share a resource with a link of the working route by use of an identifier of the link of the candidate protect route; and
    wherein the identifier is stored in the database.

12. The apparatus of claim 11, wherein the identifier comprises at least one of a fiber identifier, cable identifier, conduit identifier, right of way (ROW) identifier, zone identifier, and region identifier.

13. The apparatus of claim 8, wherein each of the working route and protect route comprises at least one of a fiber and cable; and
    wherein the resource comprises at least one of a cable, conduit, right of way (ROW), zone, and region.

14. A method for calculating a protect route in a communication network, the method comprising:
    establishing a working route in a communication network based upon a length of the working route, the working route formed by at least one working route link; and
    establishing a protect route in the communication network, the protect route formed by at least one protect route link, with the protect route being selected based upon a length of the protect route link and based upon whether a link in the protect route shares resources with the working route;
    wherein the establishing a protect route step attempts to select the protect route first from candidate protect routes which do not share resources with the working route.

15. The method of claim 14, wherein the protect route is selected to minimize shared resources with the working route.

16. The method of claim 14, wherein the resource comprises at least one of a cable, conduit, right of way (ROW), zone, and region.

* * * * *